US 8,015,134 B2

(12) United States Patent
Grichnik et al.

(10) Patent No.: US 8,015,134 B2
(45) Date of Patent: Sep. 6, 2011

(54) DETERMINING A CORRECTIVE ACTION BASED ON ECONOMIC CALCULATION

(75) Inventors: Anthony J. Grichnik, Peoria, IL (US); Michael Seskin, Cardiff, CA (US); Brian Lee Boggs, Eureka, IL (US)

(73) Assignee: Solar Turbines Inc., San Diego, CA (US)

( * ) Notice: Subject to any disclaimer, the term of this patent is extended or adjusted under 35 U.S.C. 154(b) by 1132 days.

(21) Appl. No.: 11/806,372

(22) Filed: May 31, 2007

(65) Prior Publication Data

US 2008/0301499 A1 Dec. 4, 2008

(51) Int. Cl.
*G06F 17/00* (2006.01)
*G06F 17/10* (2006.01)
*G06F 17/30* (2006.01)
*G06F 11/00* (2006.01)

(52) U.S. Cl. ............... 706/45; 706/21; 714/2; 714/26
(58) Field of Classification Search ................ 706/45
See application file for complete search history.

(56) References Cited

U.S. PATENT DOCUMENTS

| | | | |
|---|---|---|---|
| 5,952,569 A | 9/1999 | Jervis et al. | |
| 6,405,108 B1 | 6/2002 | Patel et al. | |
| 6,446,027 B1 | 9/2002 | O'Keeffe et al. | |
| 6,651,034 B1 | 11/2003 | Hedlund et al. | |
| 6,751,536 B1 | 6/2004 | Kipersztok et al. | |
| 6,859,757 B2 | 2/2005 | Muehl et al. | |
| 6,868,319 B2 | 3/2005 | Kipersztok et al. | |
| 6,981,423 B1 | 1/2006 | Discenzo | |
| 7,013,239 B2 | 3/2006 | Hedlund et al. | |
| 7,043,348 B2 | 5/2006 | Uluyol et al. | |
| 7,047,159 B2 | 5/2006 | Muehl et al. | |
| 7,065,570 B2 | 6/2006 | Fukushima et al. | |
| 7,133,804 B2 | 11/2006 | Tonack et al. | |
| 2004/0158772 A1 | 8/2004 | Pan et al. | |
| 2005/0055176 A1 | 3/2005 | Clarke et al. | |
| 2006/0230097 A1 | 10/2006 | Grichnik et al. | |

FOREIGN PATENT DOCUMENTS

GB 2 318 437 A 4/1998

OTHER PUBLICATIONS

Weidl et al., Applications of object-oriented Bayesian networks for condition monitoring, root cause analysis and decision support on operation of complex continuous processes, 2005.*
Yudkowsky, Eliezer, "An Intuitive Explanation of Bayesian Reasoning," http://yudkowsky.net/bayes/bayes.html, accessed and printed on May 31, 2007 (34 pages).

* cited by examiner

*Primary Examiner* — David R Vincent
*Assistant Examiner* — Nathan H Brown, Jr.
(74) *Attorney, Agent, or Firm* — Finnegan, Henderson, Farabow, Garrett & Dunner LLP (57) ABSTRACT

A computer-implemented method is provided for determining a corrective action. The method may include obtaining diagnostic data and calculating, using the diagnostic data, a prognostic. The method may also include retrieving, when the prognostic is above an alarm level, historical records and calculating a Bayesian posterior probability using the diagnostic data and the historical records. Further, the method may include calculating a prognostic prescience metric using the diagnostic data and the historical records and determining, based on the Bayesian posterior probability, the prognostic prescience metric, and an economic calculation, the corrective action.

20 Claims, 4 Drawing Sheets

DETERMINING A CORRECTIVE ACTION BASED ON ECONOMIC CALCULATION

TECHNICAL FIELD

This disclosure relates generally to diagnostic and prognostic monitoring, and, more particularly, to methods and systems for determining an appropriate corrective action.

BACKGROUND

Mathematical models are often built to capture complex interrelationships between input parameters and output parameters. Various techniques may be used in such models to establish correlations between input parameters and output parameters. Once the models are established, the models predict the output parameters based on the input parameters. The accuracy of these models often depends on the environment within which the models operate.

One tool that has been developed for mathematical modeling is U.S. Pat. No. 6,751,536 to Kipersztok et al. (the '536 patent). The '536 patent describes a system and method for performing diagnostic modeling to determine a maintenance action for an airplane. The system receives input relating to symptoms indicative of a failed component in an aircraft and creates a prioritized list of components that could be causing the symptoms of failure. The system may employ a Bayesian network to identify the probability that each component caused the failure, and may use cost calculations to determine whether to replace a failed component.

Although the tool of the '536 patent offers a recommendation of whether to replace a component based on a failure, the '536 patent cannot predict whether a component will fail in the future. The failure of a single component may lead to the failure of other components and to increased downtime as the machine must be suddenly taken out of service to repair the failed components. In the field of medical diagnostics, discovering that a patient already has a serious health problem may not offer a significant chance of survival. Many chronic conditions, such as heart disease, diabetes, and certain forms of cancer, can sometimes be avoided if certain lifestyle modifications can be made sufficiently prior to disease onset. Just as in the machine case, certain progressive diseases can arise from the onset of another disease. For instance, persons who contract Type II diabetes increase their risk of cardiovascular disease, which in turn increases the risk of a stroke. Machine repair, maintenance staff, and physicians would prefer a system and method that could predict when a component will fail or when a health condition would become serious, allowing the opportunity to prevent the failure and avoid the complications that arise after a component has already failed.

The present disclosure is directed to overcoming one or more of the problems set forth above.

SUMMARY OF THE INVENTION

In accordance with one aspect, the present disclosure is directed toward a computer readable medium, tangibly embodied, including a tool for determining a corrective action. The computer readable medium includes instructions for obtaining diagnostic data and calculating, using the diagnostic data, a prognostic. The instructions may also include retrieving, when the prognostic is above an alarm level, historical records and calculating a Bayesian posterior probability using the diagnostic data and the historical records. Further, the instructions may include calculating a prognostic prescience metric using the diagnostic data and the historical records and determining, based on the Bayesian posterior probability, the prognostic prescience metric, and an economic calculation, the corrective action.

According to another aspect, the present disclosure is directed toward a method for determining a corrective action. The method includes obtaining diagnostic data and calculating, using the diagnostic data, a prognostic. The method may also include retrieving, when the prognostic is above an alarm level, historical records and calculating a Bayesian posterior probability using the diagnostic data and the historical records. Further, the method may include calculating a prognostic prescience metric using the diagnostic data and the historical records and determining, based on the Bayesian posterior probability, the prognostic prescience metric, and an economic calculation, the corrective action.

According to another aspect, the present disclosure is directed to a computer system including a platform, at least one input device, and a central processing unit in communication with the platform and the at least one input device. The central processing unit may obtain diagnostic data and calculate, using the diagnostic data, a prognostic. The central processing unit may also retrieve, when the prognostic is above an alarm level, historical records and calculate a Bayesian posterior probability using the diagnostic data and the historical records. Further, the central processing unit may calculate a prognostic prescience metric using the diagnostic data and the historical records and determine, based on the Bayesian posterior probability, the prognostic prescience metric, and an economic calculation, the corrective action.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
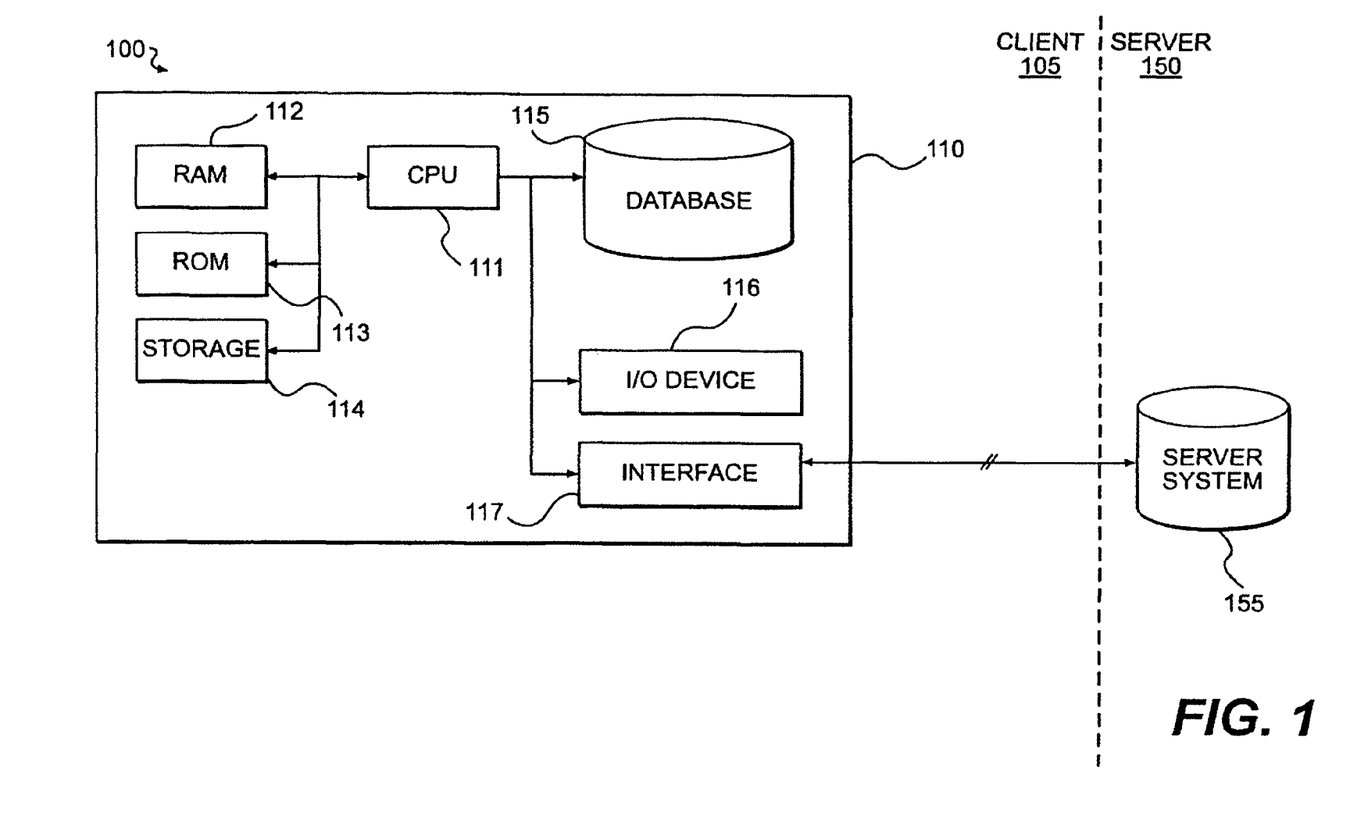
FIG. 1 is a block illustration of an exemplary disclosed system for determining a corrective action.

FIG. 1 provides a block diagram illustrating an exemplary environment 100 for determining a corrective action. Environment 100 may include a client 105 and server 150. Server 150 may include one or more server databases 155 for analyzing data input from client 105 and for determining a corrective action. Client 105 may include, for example, a machine, such as a truck or a heart monitor. The machine may collect data from sensors attached to the machine and report the data to server 150. Server 150 may collect data from a plurality of clients 105 to identify trends and perform prognostic calculations, as described below. Although illustrated as a single client 105 and a single server 150, a plurality of clients 105 may be connected to either a single, centralized server 150 or a plurality of distributed servers 150. Moreover, client 105 be a local server that collects data from a machine using, for example, wired or wireless communication.

System 110 may include any type of processor-based system on which processes and methods consistent with the disclosed embodiments may be implemented. For example, as illustrated in FIG. 1, system 110 may be a platform that includes one or more hardware and/or software components configured to execute software programs. System 110 may include one or more hardware components such as a central processing unit (CPU) 111, a random access memory (RAM) module 112, a read-only memory (ROM) module 113, a storage 114, a database 115, one or more input/output (I/O) devices 116, and an interface 117. System 110 may include one or more software components such as a computer-readable medium including computer-executable instructions for performing methods consistent with certain disclosed embodiments. One or more of the hardware components listed above may be implemented using software. For example, storage 114 may include a software partition associated with one or more other hardware components of system 110. System 110 may include additional, fewer, and/or different components than those listed above, as the components listed above are exemplary only and not intended to be limiting. For example, system 110 may include a plurality of sensors designed to collect data regarding system 110 or a machine attached to system 110.

CPU 111 may include one or more processors, each configured to execute instructions and process data to perform one or more functions associated with system 110. As illustrated in FIG. 1, CPU 111 may be communicatively coupled to RAM 112, ROM 113, storage 114, database 115, I/O devices 116, and interface 117. CPU 111 may execute sequences of computer program instructions to perform various processes, which will be described in detail below. The computer program instructions may be loaded into RAM for execution by CPU 111.

RAM 112 and ROM 113 may each include one or more devices for storing information associated with an operation of system 110 and CPU 111. RAM 112 may include a memory device for storing data associated with one or more operations of CPU 111. For example, ROM 113 may load instructions into RAM 112 for execution by CPU 111. ROM 113 may include a memory device configured to access and store information associated with system 110, including information for determining a corrective action.

Storage 114 may include any type of mass storage device configured to store information that CPU 111 may need to perform processes consistent with the disclosed embodiments. For example, storage 114 may include one or more magnetic and/or optical disk devices, such as hard drives, CD-ROMs, DVD-ROMs, or any other type of mass media device.

Database 115 may include one or more software and/or hardware components that cooperate to store, organize, sort, filter, and/or arrange data used by system 110 and CPU 111. Database 115 may store data collected by system 110 that may be used to determine a corrective action. In the example of system 110 being a vehicle, database 115 may store, for example, vehicle speed history, vehicle load history, environmental data such as a temperature and an air pressure, operating temperatures for coolant and oil, engine vibration levels, engine temperature, and oil conditions. In the example of system 110 being a medical device, database 115 may store, for example, a patient's heart rate, blood pressure, and temperature as well as their diagnostic history, history of prescription medications, and other historical treatment information. The data may be generated by sensors, collected during experiments, retrieved from repair or medical insurance claims processing, or generated artificially during a design process. CPU 111 may access the information stored in database 115 and transmit this information to server system 155 for determining a corrective action.

I/O devices 116 may include one or more components configured to communicate information with a user associated with system 110. For example, I/O devices may include a console with an integrated keyboard and mouse to allow a user to input parameters associated with system 110. I/O devices 116 may also include a display, such as a monitor, including a graphical user interface (GUI) for outputting information. I/O devices 116 may also include peripheral devices such as, for example, a printer for printing information and reports associated with system 110, a user-accessible disk drive (e.g., a USB port, a floppy, CD-ROM, or DVD-ROM drive, etc.) to allow a user to input data stored on a portable media device, a microphone, a speaker system, or any other suitable type of interface device.

The results of received data may be provided as an output from system 110 to I/O device 116 for printed display, viewing, and/or further communication to other system devices. Such an output may include the data collected by sensors attached to system 110. Output from system 110 can also be provided to database 115 and to server system 155.

Interface 117 may include one or more components configured to transmit and receive data via a communication network, such as the Internet, a local area network, a workstation peer-to-peer network, a direct link network, a wireless network, or any other suitable communication platform. In this manner, system 110 and server system 155 may communicate through the use of a network architecture (not shown). In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. For example, interface 117 may include one or more modulators, demodulators, multiplexers, demultiplexers, network communication devices, wireless devices, antennas, modems, and any other type of device configured to enable data communication via a communication network.

Server 150 may be a company, manufacturer, supplier, or distributor that determines a corrective action for system 110 based on data received from system 110. Server system 155 may collect data from a plurality of clients 110 to analyze trends in historical data and determine an appropriate corrective action for a given system 110. Examples of collecting data and determining an appropriate corrective action will be described below with reference to FIGS. 2-4.

Those skilled in the art will appreciate that all or part of systems and methods consistent with the present disclosure may be stored on or read from other computer-readable media. Environment 100 may include a computer-readable medium having stored thereon machine executable instructions for performing, among other things, the methods disclosed herein. Exemplary computer readable media may include secondary storage devices, like hard disks, floppy disks, and CD-ROM; or other forms of computer-readable memory, such as read-only memory (ROM) 113 or random-access memory (RAM) 112. Such computer-readable media may be embodied by one or more components of environment 100, such as CPU 111, storage 113, database 115, server system 155, or combinations of these and other components.

Furthermore, one skilled in the art will also realize that the processes illustrated in this description may be implemented in a variety of ways and include other modules, programs, applications, scripts, processes, threads, or code sections that may all functionally interrelate with each other to provide the functionality described above for each module, script, and daemon. For example, these programs modules may be implemented using commercially available software tools, using custom object-oriented code written in the C++ programming language, using applets written in the Java programming language, or may be implemented with discrete electrical components or as one or more hardwired application specific integrated circuits (ASIC) that are custom designed for this purpose.

The described implementation may include a particular network configuration but embodiments of the present disclosure may be implemented in a variety of data communication network environments using software, hardware, or a combination of hardware and software to provide the processing functions.

Processes and methods consistent with the disclosed embodiments may determine a corrective action and predict the likelihood of a function loss. In a machine, this function loss results from a component failure, while in a person it results from either a loss of function or excessive function of a biologic system. As a result, machine operators and doctors may monitor the status of machines and patients and determine the likelihood that a machine, component, or patient will suffer from a loss of function. The disclosed processes and methods may recommend to machine operators and doctors when a corrective action should be taken to avoid the failure. Exemplary processes, methods, and user interfaces consistent with the invention will now be described with reference to FIGS. 2-4.

INDUSTRIAL APPLICABILITY

The disclosed methods and systems provide a desired solution for determining a corrective action in a wide range of applications, such as engine design, control system design, service process evaluation, financial data modeling, manufacturing process modeling, medical modeling, and many other applications. The disclosed process may monitor the performance of the system, process, or person being monitored and determine a corrective action based on a predicted failure. The predicted corrective action may be identified using, for example, data collected from other similar systems and historical records of similar situations, actions, and their effectiveness. By identifying predicted failures, environment 100 may maintain adequate inventory levels for replacement components, schedule maintenance based on a cost/benefit analysis (discussed below), and ensure optimal operation of machines. Moreover, operational costs for machines may be reduced by only servicing components that are likely to fail. In the medical case, unnecessary pain and suffering may be avoided by taking appropriate corrective actions prior to disease onset.

Figure 2:
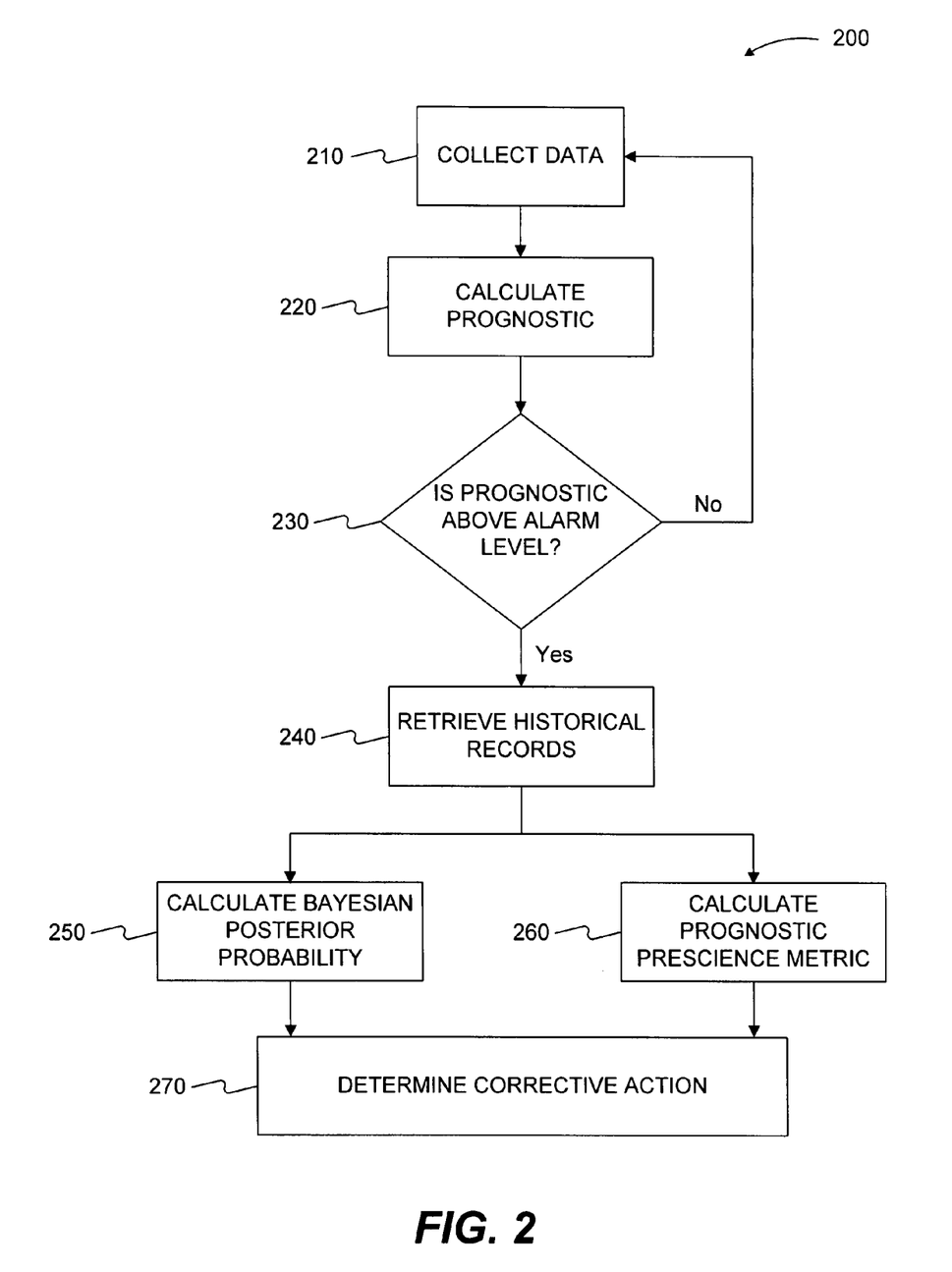
FIG. 2 is a flowchart illustration of an exemplary disclosed method of determining a corrective action.

FIG. 2 illustrates an exemplary disclosed method of determining a corrective action. System 110 may collect data from the machine being monitored (Step 210). For example, system 110 may collect data from a bulldozer using, for example, sensors that are attached to various components of the bulldozer. Exemplary data includes air flow measurements through an air filter, crankcase pressure, oil filter pressure, engine coolant temperature, engine load, exhaust temperature, and other sensor data that may be useful in determining a corrective action. The data may be collected continuously, on demand, or periodically.

Next, system may monitor the data and calculate a prognostic (Step 220). The prognostic may be an alarm that system 110 triggers when the data meets a predefined condition. For example, an engineer who designs a bulldozer may determine that when an engine temperature rises above a defined level, a check engine light may alert the user of a potential problem. System 110 may monitor the engine temperature and calculate whether the temperature exceeds the defined level. The prognostic may not indicate that a component has failed; rather, the prognostic provides a relative measure indicating that a component might fail.

Prognostics may be calculated using a plurality of data inputs for the machine being monitored. For example, calculating a prognostic that predicts when a bearing will fail on a bulldozer may use, for example, operating conditions, the load on the machine, vibration levels, temperature levels, and the amount power that the machine has generated recently. System 110 may determine the predetermined condition for triggering an alarm using data collected from other similar machines and the repair history of those machines. This information may include, for example, the percentage of machines or components that failed after the input data reached a predefined level and the amount of time a machine or component continued to operate after the input data reached a predefined level. The calculations may utilize neural network modeling and a scale, such as 0 to 100, to indicate the relative likelihood that the bearing will fail.

System 110 may then determine whether the prognostic is above an alarm level (Step 230). In the example of using a scale from 0 to 100, system 110 may determine that a prognostic with a value of, for example, 50 is above an alarm level or a predefined threshold of 49. If the prognostic is not above an alarm level, the machine being monitored is healthy and system 110 may continue to collect data (Step 210). However, if the prognostic is above an alarm level, system 110 may continue to determine a corrective action.

Next, system 110 may retrieve historical records (Step 240). For example, system 110 may retrieve historical records from database 115 for the machine being monitored and may also retrieve historical records from server 150 for other similar machines. The historical records may include all of the data necessary to determine a corrective action for the machine or component that had a prognostic above the alarm level. Examples of data include maintenance records for the machine being monitored, the corrective actions that were performed in other similar machines when the alarm occurred, whether those corrective actions were proper (e.g., the machine continued to operate normally), and how many machines failed after the alarm occurred.

System 110 may then calculate a Bayesian Posterior Probability using the data and the historical records (Step 250) to determine an absolute risk of continuing to operate a machine and to identify an appropriate corrective action. For example, assume an oil pump triggered a prognostic alarm. A Bayesian Posterior Probability calculation may consider the percentage of similar machines with failed oil pumps, the percentage of machines with failed oil pumps that also triggered the same alarm, and the percentage of machines that triggered the alarm but did not have a failing oil pump. The process of performing a Bayesian Posterior Probability calculation will be described in more detail below with reference to FIG. 3.

System 110 may also calculate a prognostic prescience metric (Step 260). A prognostic prescience metric may provide the absolute risk at a specific point in time that a failure will occur or a corrective action is needed. The prognostic prescience metric may define, over a given time range, the probability of needing a corrective action given that an alarm occurred (Step 230) while weighting more heavily results that are increasingly prior to the time similar failures occurred. An example of calculating a prognostic prescience metric will be described in detail below with reference to FIG. 4.

System 110 may determine a corrective action using the results of the Bayesian Posterior Probability calculation (Step 250) and the prognostic prescience metric (Step 260). Determining a corrective action may involve performing an economic calculation that balances the urgency of the corrective action with the cost impact on the operation of the machine.

The urgency of the corrective action may be identified by the Bayesian Posterior Probability calculation and the prognostic prescience metric. Together, these calculations will identify whether the machine needs a corrective action, what corrective action the machine needs, and the time frame within which the corrective action should be completed. For example, the calculations may identify that when an engine experiences increased vibration levels, the machine should be taken out of service for a corrective action to avoid complications with the operation of the engine. This determination may be computed based on the repair history of the machine that triggered the alarm (e.g., an engine exchange may have recently occurred, indicating the increased vibration levels may have resulted from an error during engine installation) and the repair history of other similar machines.

The cost impact on the operation of the machine may include a plurality of factors, such as the costs of the corrective action, whether the necessary components for the corrective action are in inventory, the production losses that will result from taking the machine out of operation to perform the corrective action, the duration of the corrective action, the future impact on operational costs if the corrective action is not performed immediately (e.g., whether not repairing one component will lead to the failure of additional components), and whether any replacement machines are available. System 110 may also consider other factors, such as the impact to the environment. For example, although a machine with a leaking oil filter may continue to operate normally if an operator adds more oil periodically, the leaking oil may damage the environment and therefore the machine should be taken out of service to replace the oil filter.

As an example of performing an economic calculation, assume that a machine triggered the two alarms discussed above: increased engine vibration and a leaking oil filter. Further assume the results of the Bayesian Posterior Probability and prognostic prescience metric calculations indicate that both of these alarms can lead to serious engine complications that will result in significant downtime to perform additional repairs. Therefore, the corrective action should be performed as soon as possible. However, the economic loss due to having the machine out of operation may exceed the costs of performing the additional repairs resulting from the engine vibration. Therefore, although the physical state of the machine indicates that a corrective action should be performed, the economic costs outweigh the benefit of repairing the machine. The operator of the machine may therefore choose to delay the corrective action until a replacement vehicle can be obtained while repairing the machine that triggered the alarm. The leaking oil filter, however, may be repaired within a relatively short period of time (e.g., an hour), and therefore an operator may replace the oil filter immediately. In addition, due to the potential impact on the environment, the operator may be required to replace the oil filter immediately. However, if the vehicle was scheduled for a routine maintenance that includes replacing the oil filter in the near future and the operator can avoid the potential environmental impact (e.g., using a catch can to collect the leaking oil), the operator may choose to ignore the alarm until the routine maintenance occurs. Although several exemplary factors have been described for performing an economic calculation, additional factors may be considered in determining whether to perform a corrective action.

Figure 3:
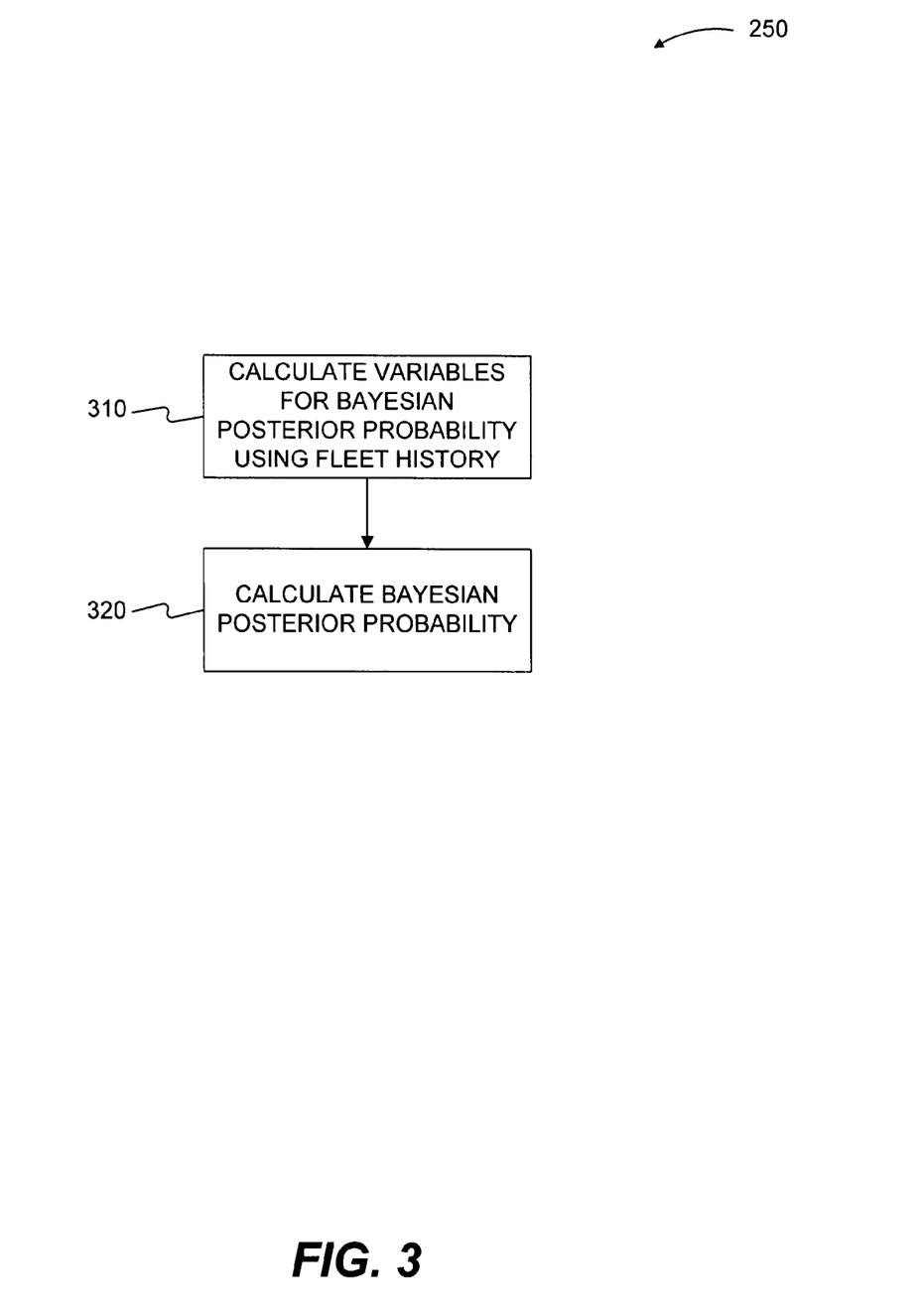
FIG. 3 is a flowchart illustration of an exemplary disclosed method of calculating a Bayesian posterior probability.

FIG. 3 illustrates an exemplary disclosed method of calculating a Bayesian posterior probability. System 110 may calculate a Bayesian posterior probability as:

$$p(A_t \mid X_\psi) = \frac{p(X_\psi \mid A_t) * p(A_t)}{p(X_\psi \mid A_t) * p(A_t) + p(X_\psi \mid \sim A_t) * p(\sim A_t)}$$

$A_t$ represents a defined corrective action; X represents the alarm being triggered (both in the machine being monitored and in other similar machines); and $p(A_t|X_\psi)$ therefore represents the normalized probability or frequency of needing a defined corrective action when the alarm occurred. $p(X_\psi|A_t)$ represents the probability that the alarm is triggered when a defined corrective action is needed; and $p(X_\psi|\sim A_t)$ represents the probability that the alarm is triggered when a defined corrective action is not needed (e.g., false positive). $p(A_t)$ represents the probability of needing a defined corrective action; and $p(\sim A_t)$ represents the probability of not needing a defined corrective action.

At step 310, system 110 may calculate the variables needed to perform a Bayesian posterior probability calculation. For example, assume that a machine triggers an alarm because the oil pressure dropped below an alarm level (FIG. 2, Step 230). When calculating a Bayesian posterior probability to identify which corrective action is appropriate, one exemplary corrective action for reduced oil pressure is replacing an oil filter. In this example, $p(A_t|X_\psi)$ represents the probability that replacing an oil filter is the appropriate repair given that the oil pressure dropped below an alarm level. System 110 may calculate $p(X_\psi|A_t)$, the probability that the oil pressure dropped below an alarm level because the oil filter is faulty, by using the fleet history. The fleet history may include the repair and maintenance records for similar machines that triggered similar alarms, as described above. In this example, $p(X_\psi|A_t)$ may be calculated by identifying the number of similar machines in which replacing the oil filter restored the oil pressure to proper levels. $p(A_t)$, the probability that an oil filter will need replaced at the interval from the prior replacement to when the alarm was triggered, may be calculated by determining the number of oil filters that have failed at same interval as when the alarm was triggered. $p(X_\psi|\sim A_t)$, the probability that the oil pressure dropped below an alarm level because of a factor other than the oil filter, may be calculated by identifying the number of vehicles that needed a corrective action other than replacing the oil filter to restore the oil pressure proper levels. $p(\sim A_t)$ represents the probability that an oil filter will not need replaced at the interval from which the machine triggered the alarm.

At step 320, system 110 may calculate the Bayesian posterior probability (an absolute measure) for the machine that triggered the alarm using the variables calculated in step 310. The Bayesian posterior probability may fall within a range, such as 0 to 100, with a higher number indicating that the corrective action is more likely to be the proper corrective action (e.g., replacing the oil filter will restore the oil pressure levels). The process in FIG. 3 may be repeated to calculate a Bayesian posterior probability for each available corrective action to identify which corrective action is most likely to restore the oil pressure. Exemplary corrective actions when an oil pressure drops below an alarm level include replacing an oil filter, replacing oil feed lines, using a higher viscosity oil, and replacing piston rings. These different Bayesian posterior probabilities may then be compared to identify the corrective action that is most likely to correct the problem.

Bayesian posterior probabilities may also be calculated to determine whether the machine is likely to fail if a defined corrective action is not performed. This calculation may identify an absolute measure of whether the corrective action is needed, that is, whether the machine will fail given that an alarm occurred. This calculation assists an operator to balance the economic costs of whether to remove a machine from operation to perform a corrective action. Fleet history may identify the variables necessary to perform the Bayesian posterior probability calculation based on prior similar alarms from other machines, including the probability that the alarm occurred because the component failed and the probability that the alarm occurred but the component did not fail.

Figure 4:
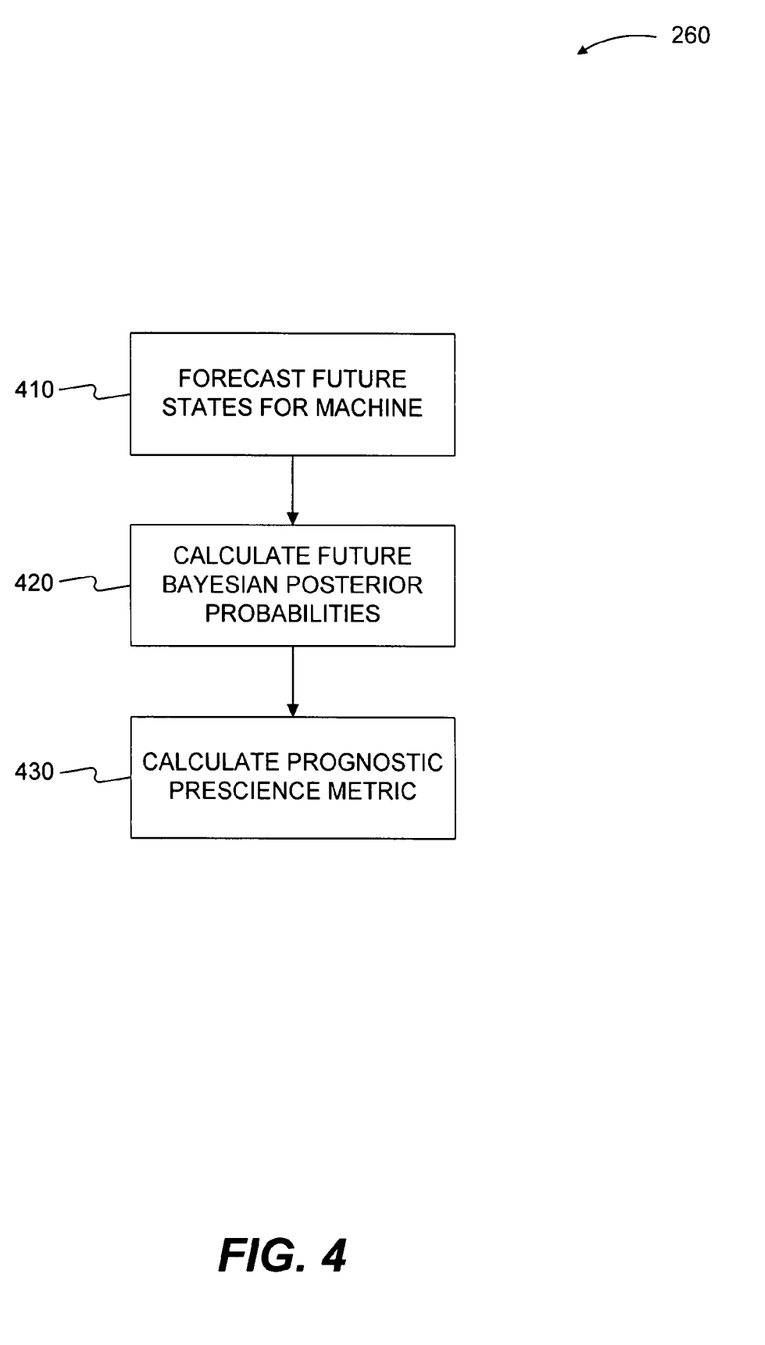
FIG. 4 is a flowchart illustration of an exemplary disclosed method of calculating a prognostic prescience metric.

FIG. 4 illustrates an exemplary disclosed method of calculating a posterior probability metric. System 110 may use the posterior probability metric to determine whether an identified corrective action is appropriate at a given time. For example, although the Bayesian posterior probability may indicate that an oil filter should be replaced to restore oil pressure and that the alarm likely indicates the oil filter failed, an operator would also like to know when to perform the corrective action. If a machine can continue operating safely for several days, weeks, or months despite the needed corrective action, the corrective action can be delayed and additional revenue can be obtained through continued operation of the machine. Moreover, the costs of maintenance and performing corrective actions can be reduced by not prematurely repairing a component that may have additional useful life. The prognostic prescience metric therefore indicates to an operator whether the generation of an alarm requires action at the time the alarm occurred.

System 110 may calculate a prognostic prescience metric as:

$$\mu = \sum_1^t p(A_t \mid X_{\psi,t}) * \frac{(e^t/e^{tmax})}{\sum_1^t (e^t/e^{tmax})},$$

$\mu$ represents the probability that the prognostic should be trusted at this time, with higher values indicating the absolute risk is more accurate and the possible failure is further into the future; t is a lower time measurement going back from the time of calculation (e.g., t=2 may correspond to 2 years prior to the calculation); tmax is the upper time range to calculate the prognostic prescience metric (the oldest time measured back from the time of calculation, e.g., 6 years); $p(A_t \mid X_{\psi,t})$ is the probability of a failure at time t given that the alarm occurred at time t (calculated as described with reference to FIG. 3), and e is the base of natural logarithms.

The prognostic prescience metric utilizes the Bayesian Posterior Probability calculation and determines whether that calculation should be trusted at a given time by weighting more heavily older calculations. System 110 may recalculate the Bayesian Posterior Probability calculation for each year and give more weight to older calculations that are more likely to correctly identify future faults in a machine.

With reference to FIG. 4, system 110 may forecast future states of a machine (Step 410) using input forecasting and output forecasting. For example, system 110 may forecast a future oil pressure level of 10 psi in 5 days based on a current oil pressure level of 150 psi and a measured decrease in oil pressure of 10 psi per day. System 110 may also examine fleet data to forecast the future states of machines by examining how other machines reacted after having similar conditions to the machine currently being observed.

Next, system 110 may calculate Bayesian posterior probabilities for determining a corrective action using the forecasted states of a machine (Step 420). The calculation in Step 420 is similar to that described above with respect to FIG. 3, except that the variables used for the Bayesian posterior probabilities are based on a predicted state of the machine and fleet history, rather than a current state of the machine and fleet history. The Bayesian posterior probabilities may be calculated, as described above, and summed over the interval of 1 (the time of calculation) to t.

System 110 may then calculate the prognostic prescience metric using the Bayesian posterior probabilities from 1 to t (Step 430). System 110 may multiply the summed Bayesian posterior probabilities determined in Step 420 by $$\frac{(e^t/e^{tmax})}{\sum_1^t (e^t/e^{tmax})}$$

to weight older results more heavily. The result, $\mu$, is a dimensionless probability from 0 to 100% that the prognostic should be trusted at this time, with higher values indicating the absolute risk of failure is more accurate and more distant into the future. A machine operator may be more likely to perform maintenance or repairs on machines at earlier times as the prognostic prescience metric increases (e.g., if the metric rises above 70%). However, the operator may also consider other factors, such as economic factors, in determining when to perform a corrective action, as described above (FIG. 2, Step 270).

Although system 110 has been described as performing the calculating, monitoring, retrieving of historical records, and determining a corrective action, server 150 may also perform one or more of these functions. System 110 may transmit the data and historical records for the machine being monitored to server 150, and server 150 may collect the information from other similar machines, perform the described calculations, and determine a corrective action. Server 150 may then notify system 110, or an operator of system 110, of the corrective action that should be taken and when to perform the corrective action.

The system may be designed for medical reasons to identify and predict people who are likely to be diagnosed with a disease, allowing preventative treatments or corrective actions to occur prior to disease onset. In the example of medical calculations, the data may include demographics, how other people with similar symptoms were treated (e.g., drugs, chemotherapy, physical rehabilitation), whether treatments were effective, and the survival rate for people diagnosed with similar diseases. By identifying and treating diseases prior to or at the beginning of their onset, the costs of healthcare may be reduced and the survival rate of patients may increase.

It will be apparent to those skilled in the art that various modifications and variations can be made to the disclosed methods. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-implemented method for determining a corrective action, comprising:
   obtaining diagnostic data;
   calculating, using the diagnostic data, a prognostic;
   retrieving, when the prognostic is above an alarm level, historical records;
   calculating a Bayesian posterior probability using the diagnostic data and the historical records;
   calculating a prognostic prescience metric using the diagnostic data and the historical records;
   performing an economic calculation using a processor associated with a computer; and
   determining, based on the Bayesian posterior probability, the prognostic prescience metric, and the economic calculation, the corrective action.

2. The computer-implemented method of claim 1, wherein the corrective action comprises a repair to a machine.

3. The computer-implemented method of claim 1, wherein the corrective action comprises a medical intervention to a patient.

4. The computer-implemented method of claim 1, wherein the diagnostic data and the historical records include data indicating a status of a component of one or more machines.

5. The computer-implemented method of claim 1, wherein the diagnostic data and the historical records include data indicating a status of a biological function of one or more patients.

6. The computer-implemented method of claim 1, wherein the Bayesian posterior probability is calculated as $$p(A_t \mid X_\psi) = \frac{p(X_\psi \mid A_t) * p(A_t)}{p(X_\psi \mid A_t) * p(A_t) + p(X_\psi \mid \sim A_t) * p(\sim A_t)}$$

provided that $A_t$ represents a defined corrective action,
X represents the alarm being triggered,
$p(A_t \mid X_\psi)$ represents the normalized probability of needing the defined corrective action when the alarm occurred,
$p(X_\psi \mid A_t)$ represents the probability that the alarm is triggered when the defined corrective action is needed,
$p(X_\psi \mid \sim A_t)$ represents the probability that the alarm is triggered when the defined corrective action is not needed,
$p(A_t)$ represents the probability of needing the defined corrective action, and
$p(\sim A_t)$ represents the probability of not needing the defined corrective action.

7. The computer-implemented method of claim 1, wherein the prognostic prescience metric is calculated as $$\mu = \sum_1^t p(A_t \mid X_{\psi,t}) * \frac{(e^t / e^{tmax})}{\sum_1^t (e^t / e^{tmax})},$$

provided that $\mu$ represents the accuracy of the prognostic over time,
t represents a lower time measurement going back from the time of calculation,
t max represents the upper time range to calculate the prognostic prescience metric,
$p(A_t \mid X_{\psi,t})$ is the probability of a failure at time t given that the alarm occurred at time t, and
e is the base of natural logarithms.

8. A computer-readable medium, tangibly embodied, including a tool for determining a corrective action, the computer-readable medium comprising instructions for:
   obtaining diagnostic data;
   calculating, using the diagnostic data, a prognostic;
   retrieving, when the prognostic is above an alarm level, historical records;
   calculating a Bayesian posterior probability using the diagnostic data and the historical records;
   calculating a prognostic prescience metric using the diagnostic data and the historical records;
   performing an economic calculation; and
   determining, based on the Bayesian posterior probability, the prognostic prescience metric, and the economic calculation, the corrective action.

9. The computer-readable medium of claim 8, wherein the corrective action comprises a repair to a machine.

10. The computer-readable medium of claim 8, wherein the corrective action comprises a medical intervention to a patient.

11. The computer-readable medium of claim 8, wherein the diagnostic data and the historical records include data indicating a status of a component of one or more machines.

12. The computer-readable medium of claim 8, wherein the diagnostic data and the historical records include data indicating the status of a biological function of one or more patients.

13. The computer-readable medium of claim 8, wherein the Bayesian posterior probability is calculated as $$p(A_t \mid X_\psi) = \frac{p(X_\psi \mid A_t) * p(A_t)}{p(X_\psi \mid A_t) * p(A_t) + p(X_\psi \mid \sim A_t) * p(\sim A_t)}$$

provided that $A_t$ represents a defined corrective action,
X represents the alarm being triggered,
$p(A_t \mid X_\psi)$ represents the normalized probability of needing the defined corrective action when the alarm occurred,
$p(X_\psi \mid A_t)$ represents the probability that the alarm is triggered when the defined corrective action is needed,
$p(X_\psi \mid \sim A_t)$ represents the probability that the alarm is triggered when the defined corrective action is not needed,
$p(A_t)$ represents the probability of needing the defined corrective action, and
$p(\sim A_t)$ represents the probability of not needing the defined corrective action.

14. The computer-readable medium of claim 8, wherein the prognostic prescience metric is calculated as $$\mu = \sum_1^t p(A_t \mid X_{\psi,t}) * \frac{(e^t / e^{tmax})}{\sum_1^t (e^t / e^{tmax})},$$

provided that ,$\mu$ represents the accuracy of the prognostic over time,
t represents a lower time measurement going back from the time of calculation,
t max represents the upper time range to calculate the prognostic prescience metric,
$p(A_t \mid X_{\psi,t})$ is the probability of a failure at time t given that the alarm occurred at time t, and
e is the base of natural logarithms.

15. A system comprising:
a platform;
at least one input device; and
at least one central processing unit in communication with the platform and the at least one input device, wherein the central processing unit:
obtains diagnostic data;
calculates, using the diagnostic data, a prognostic;
retrieves, when the prognostic is above an alarm level, historical records;
calculates a Bayesian posterior probability using the diagnostic data and the historical records;
calculates a prognostic prescience metric using the diagnostic data and the historical records;
performs an economic calculation; and
determines, based on the Bayesian posterior probability, the prognostic prescience metric, and the economic calculation, the corrective action.

16. The system of claim 15, wherein:
the corrective action comprises a repair to a machine, and
the diagnostic data and the historical records include data indicating a status of a component of one or more machines.

17. The system of claim 15, wherein:
the corrective action comprises a medical intervention to a patient, and
the diagnostic data and the historical records include data indicating a status of a biological function of one or more patients.

18. The system of claim 15, wherein the central processing unit calculates the Bayesian posterior probability as $$p(A_t | X_\psi) = \frac{p(X_\psi | A_t) * p(A_t)}{p(X_\psi | A_t) * p(A_t) + p(X_\psi | \sim A_t) * p(\sim A_t)}$$

provided that $A_t$ represents a defined corrective action,
X represents the alarm being triggered,
$p(A_t|X_\psi)$ represents the normalized probability of needing the defined corrective action when the alarm occurred,
$p(X_\psi|A_t)$ represents the probability that the alarm is triggered when the defined corrective action is needed,
$p(X_\psi|\sim A_t)$ represents the probability that the alarm is triggered when the defined corrective action is not needed,
$p(A_t)$ represents the probability of needing the defined corrective action, and
$p(\sim A_t)$ represents the probability of not needing the defined corrective action.

19. The system of claim 15, wherein the central processing unit calculates the prognostic prescience metric as $$\mu = \sum_1^t p(A_t | X_{\psi,t}) * \frac{(e^t/e^{tmax})}{\sum_1^t (e^t/e^{tmax})},$$

provided that µ represents the accuracy of the prognostic over time,
t represents a lower time measurement going back from the time of calculation,
t max represents the upper time range to calculate the prognostic prescience metric,
$p(A_t|X_{\psi,t})$ is the probability of a failure at time t given that the alarm occurred at time t, and
e is the base of natural logarithms.

20. The system of claim 15, wherein the central processing unit performs an economic calculation to determine the corrective action.

* * * * *